US010230950B2

(12) United States Patent
Peng et al.

(10) Patent No.: US 10,230,950 B2
(45) Date of Patent: Mar. 12, 2019

(54) BIT-RATE CONTROL FOR VIDEO CODING USING OBJECT-OF-INTEREST DATA

(71) Applicant: INTEL CORPORATION, Santa Clara, CA (US)

(72) Inventors: Ya-Ti Peng, Santa Clara, CA (US); Yi-Jen Chiu, San Jose, CA (US); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 817 days.

(21) Appl. No.: 13/906,031

(22) Filed: May 30, 2013

(65) Prior Publication Data

US 2014/0355671 A1 Dec. 4, 2014

(51) Int. Cl.

*H04N 19/167* (2014.01)
*H04N 19/115* (2014.01)
*H04N 19/176* (2014.01)
*H04N 19/117* (2014.01)
*H04N 19/124* (2014.01)

(52) U.S. Cl.

CPC ......... *H04N 19/115* (2014.11); *H04N 19/117* (2014.11); *H04N 19/124* (2014.11); *H04N 19/167* (2014.11); *H04N 19/176* (2014.11)

(58) Field of Classification Search

CPC .. H04N 19/167; H04N 19/176; H04N 19/124; H04N 19/117
USPC ..................................................... 375/240.08
See application file for complete search history.

(56) References Cited

U.S. PATENT DOCUMENTS

| | | | | |
|---|---|---|---|---|
| 6,256,423 | B1 | 7/2001 | Krishnamurthy et al. | |
| 6,801,665 | B1 | 10/2004 | Atsumi et al. | |
| 2001/0036229 | A1* | 11/2001 | Chen | H04N 9/75 375/240.08 |
| 2003/0095599 | A1 | 5/2003 | Lee et al. | |
| 2004/0228535 | A1 | 11/2004 | Honda et al. | |
| 2010/0046612 | A1* | 2/2010 | Sun | H04N 19/149 375/240.02 |
| 2010/0061444 | A1* | 3/2010 | Wilkins | H04N 19/10 375/240.02 |
| 2011/0273621 | A1* | 11/2011 | Richardson | H04N 21/4402 348/608 |
| 2011/0276652 | A1 | 11/2011 | Mukherjee et al. | |
| 2012/0321206 | A1* | 12/2012 | Sato | H04N 19/80 382/233 |
| 2013/0107948 | A1 | 5/2013 | DeForest et al. | |

FOREIGN PATENT DOCUMENTS

| | | |
|---|---|---|
| CN | 1420690 | 5/2003 |
| EP | 2809073 A1 | 12/2014 |

OTHER PUBLICATIONS

Third Office Action for Chinese Patent Application No. 201410235369.0, dated Dec. 5, 2017.

(Continued)

*Primary Examiner* — Gims S Philippe
*Assistant Examiner* — Mainul Hasan
(74) *Attorney, Agent, or Firm* — Green, Howard & Mughal LLP.

(57) ABSTRACT

Systems, articles, and methods include bit-rate control for video coding using object-of-interest data that adjusts the quality of part of an image depending on the distance of the position of a macroblock from an object in the image.

23 Claims, 8 Drawing Sheets

(56) References Cited

OTHER PUBLICATIONS

Office Action for Chinese Patent Application No. 201410235369.0, dated Jul. 3, 2017.
European Search Report received for EP Patent Application No. 14170365.2, dated Sep. 26, 2014, 6 Pages.
Viola et al., “Rapid Object Detection using a Boosted Cascade of Simple Features”, Proceedings of the 2001 IEEE Computer Society Conference on Computer Vision and Pattern Recognition, vol. 1, 2001, 8 Pages.
Office Action for Chinese Patent Application No. 20140235369.0, dated Jan. 22, 2017. No translation provided.
European Search Report for EP Application No. 14170365.2, dated May 9, 2016.
Agrafiotis, D. et al., “Optimized sign language video coding based on eye-tracking analysis”, Visual Communications and Image Processing, Aug. 7, 2003 to Nov. 7, 2003; Lugano, Jul. 8, 2003, XP030080742.
Notice of Allowance for Chinese Patent Application No. 201410235369.0, dated Apr. 2, 2018.

* cited by examiner

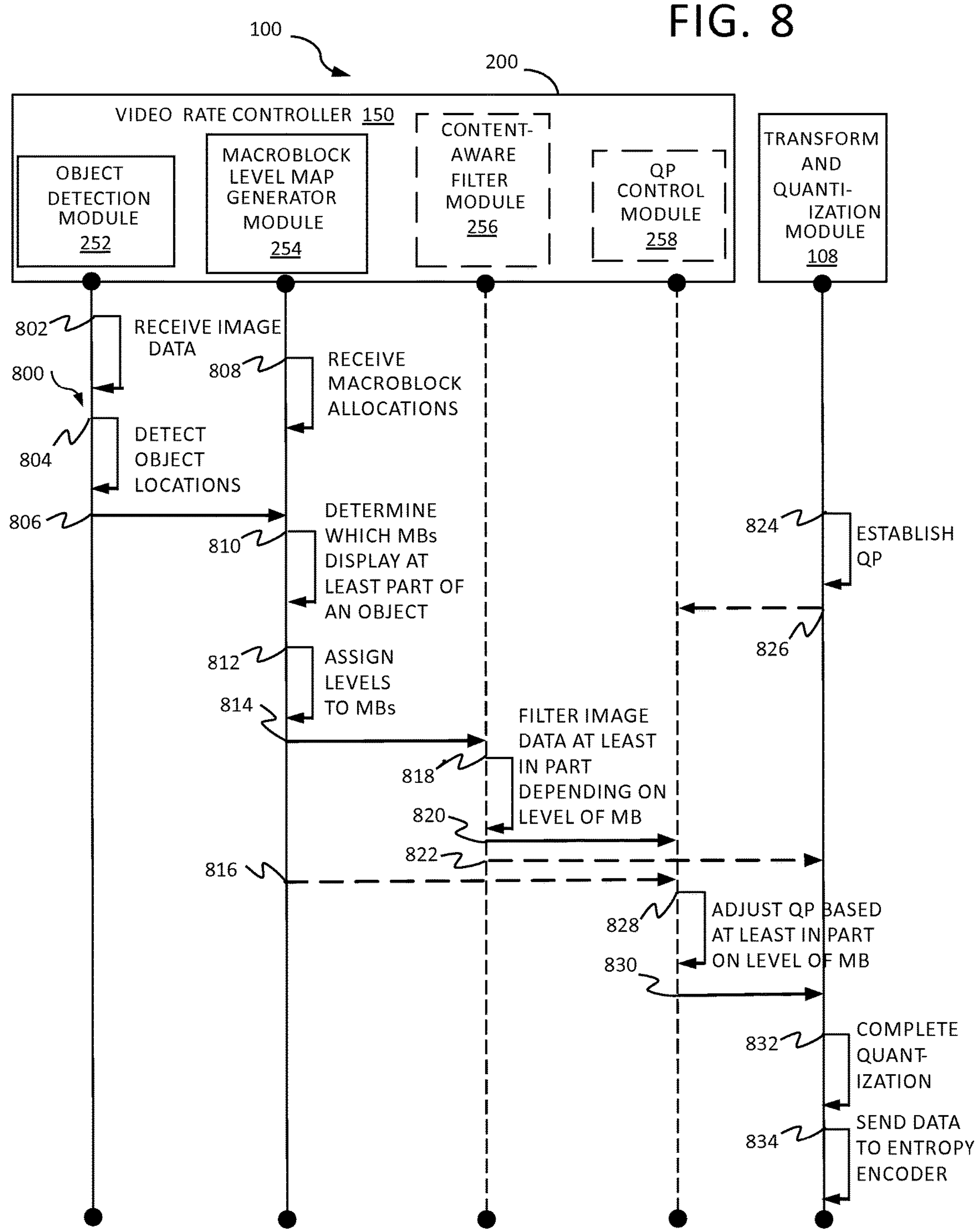
FIG. 8
100
200
VIDEO RATE CONTROLLER 150
OBJECT DETECTION MODULE 252
MACROBLOCK LEVEL MAP GENERATOR MODULE 254
CONTENT-AWARE FILTER MODULE 256
QP CONTROL MODULE 258
TRANSFORM AND QUANTI-IZATION MODULE 108
802
RECEIVE IMAGE DATA
800
808
RECEIVE MACROBLOCK ALLOCATIONS
804
DETECT OBJECT LOCATIONS
806
DETERMINE WHICH MBs DISPLAY AT LEAST PART OF AN OBJECT
810
824
ESTABLISH QP
826
812
ASSIGN LEVELS TO MBs
814
FILTER IMAGE DATA AT LEAST IN PART DEPENDING ON LEVEL OF MB
818
820
822
816
ADJUST QP BASED AT LEAST IN PART ON LEVEL OF MB
828
830
832
COMPLETE QUANT-IZATION
834
SEND DATA TO ENTROPY ENCODER

BIT-RATE CONTROL FOR VIDEO CODING USING OBJECT-OF-INTEREST DATA

BACKGROUND

Voice Over Internet Protocol (VoIP) provides various data transmission services including multimedia sessions such as video conferencing with two-way or broadcast video and audio transmissions. With increased quality and lowered costs, video conferencing has become very popular. This has increased the importance of bit-rate efficiencies for applications such as video conferencing that provide for sharing and transmitting large volumes of multimedia data. Such transmissions use a video encoder that compresses video information so that more information can be sent over a given bandwidth. The compressed signal may then be transmitted to a receiver that decodes or decompresses the signal prior to display. Some networks with lower bandwidths require the lowering of the overall bit-rate in order to receive and display video data even while maintaining visual quality for key content in the video. For networks with relatively large bandwidths, lowering the bit-rate while maintaining visual quality for key content in the video provides a greater bandwidth that is free for use for other transmissions whether related to the display or audio of the video being transmitted or other unrelated network transmissions.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 8 is an illustrative diagram of an example video coding process in operation;

DETAILED DESCRIPTION

Figure 1:
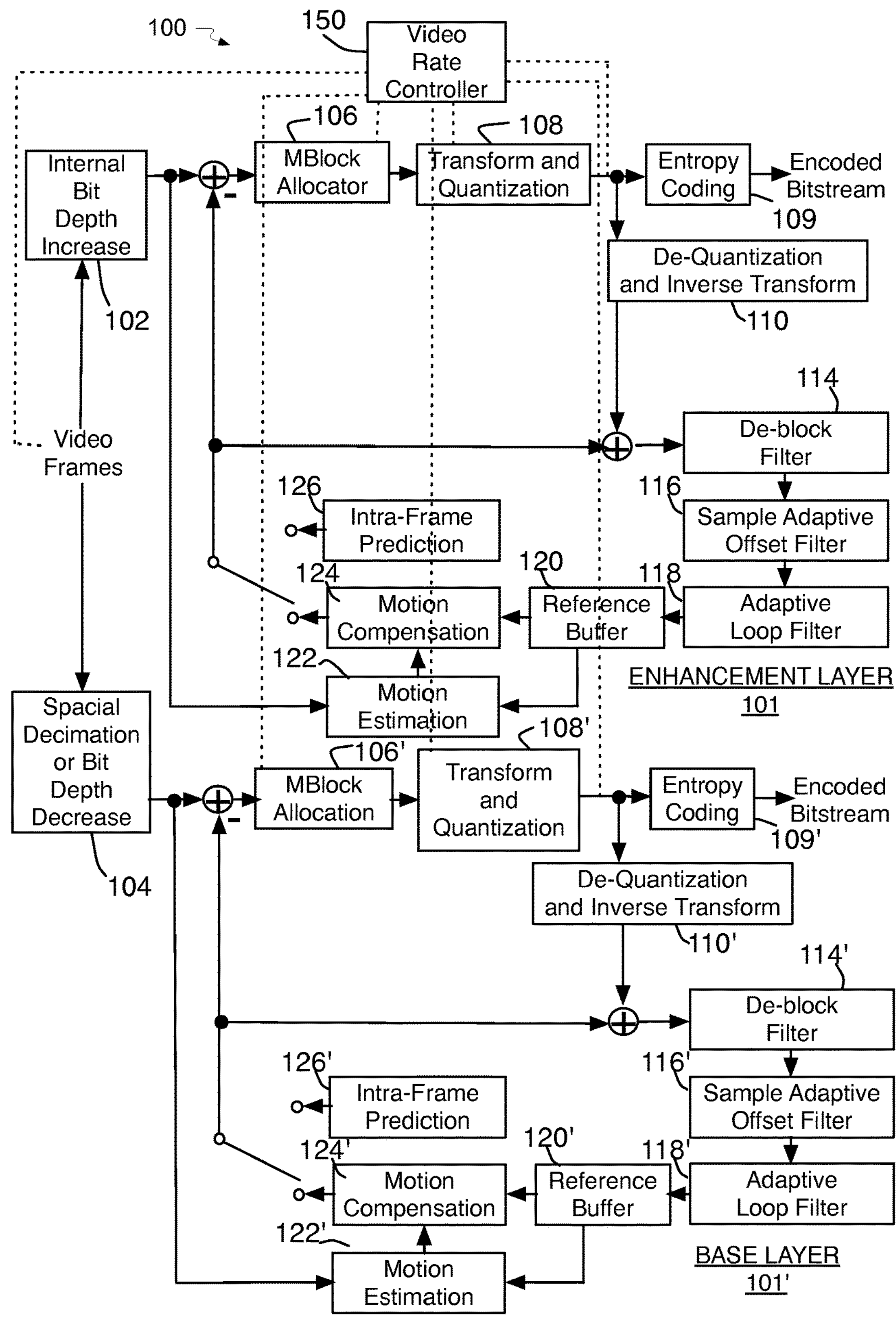
FIG. 1 is an illustrative diagram of an example video coding system.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, and so forth, may implement the techniques and/or arrangements described herein. Further, while the following description may set forth numerous specific details, such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods are described below including bit-rate control for video coding using object-of-interest data.

Encoded bitstreams may use transmission pathways from an encoder to a decoder with maximum bandwidths or bit-rates capacities, and these transmission pathways may or may not be shared with other data streams. The decoder may also place other restrictions on the bit-rate. Thus, lowering the bit-rate for a video or VoIP transmissions such as video conferencing transmissions by one example may provide high quality video transmissions on a lower bandwidth network or provide free bandwidth for other network transmissions.

One approach for lowering the bit-rate for video conferencing includes parametric modeling of object-of-interest features on the display such as human faces. Parametric models provide model parameters for rendering the detected object. With such models, the codec system merely transmits a basic mesh or wire frame of the detected object to a receiver as well as parameters for rebuilding the object. The receiver or decoder then rebuilds the object-of-interest on the image using the rendering parameters and reuses background data provided previously. This approach, however, is limited by the particular animation capabilities on a receiver side which may cause unrealistic or degraded images and unnatural movement of the object.

For many video or VoIP transmissions, such as during video conferencing, users often focus their attention on the people or person who is talking in the foreground and pay less attention to the surrounding background. The human eye operates in a similar manner to that of the focus of field concept used with digital cameras where the item focused on is typically in clear focus, while other secondary items in the foreground and/or background may be blurry or of lower quality. As will be described below, it is now possible to transmit an encoded bitstream with a lower bit-rate for a video transmission by reducing the image quality of the background in the image while maintaining a high quality image for the object-of-interest in the image. This may be performed on a macroblock-level basis where the quality of the image provided by a macroblock depends upon the distance from the macroblock to a point defined by the position of an object on the image.

The coding standard for the system may be H.264 with Advanced Video Codec (AVC) and SVC extension (such as H.264/MPEG-4 AVC-SVC, for example), or the like, such as MPEG-2 or VCI, and so forth, although many other versions or standards may operate adequately with the disclosed video coding system. High Efficiency Video Coding (HEVC) also may be used with SVC in the present system. Other standards that may be used include VP8/WebM from Google, and so forth.

SVC is an important tool used to cope with the heterogeneity of networks and devices in modern video service environments. An SVC bitstream contains several subset bitstreams that can be decoded independently, and these sub streams represent the source video content with different resolution, frame rate, quality, bit depth, and so forth. The scalabilities are achieved by using a multi-layer coding structure. In general, there is typically one base layer, which may be encoded at first, and then several enhancement layers in an SVC system. The present disclosure provides for maintenance of a high quality image, and therefore might be more suited for one of the enhancement layers, but may be used for any of the layers including the base layer. The present system may be provided at a single layer, all layers, or only particular layers, such as those that provide for a certain minimum quality image.

Referring to FIG. 1, an example video coding system 100 is arranged in accordance with at least some implementations of the present disclosure. In various implementations, video coding system 100 may be configured to undertake video coding and/or implement video codecs according to one or more standards mentioned above. Further, in various forms, video coding system 100 may be implemented as part of an image processor, video processor, and/or media processor and may undertake inter prediction, intra prediction, predictive coding, and/or residual prediction.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder.

In some examples, video coding system 100 may include additional items that have not been shown in FIG. 1 for the sake of clarity. For example, video coding system 100 may include a processor, a radio frequency-type (RF) transceiver, a display, and/or an antenna. Further, video coding system 100 may include additional items such as a speaker, a microphone, an accelerometer, memory, a router, network interface logic, and so forth, that have not been shown in FIG. 1 for the sake of clarity.

In some examples, video coding system 100 may perform SVC operations. For example, two spatial resolution layers (e.g., base layer 101' and enhancement layer 101), are illustrated; however, any number of enhancement layers may be utilized in addition to base layer 101'. Base layer 101' may be processed via an H.264/AVC (and/or an HEVC) compatible encoder. Information associated with base layer (for example, such as prediction mode, reconstructed pixel, and so on) may be used for coding of enhancement layer 101.

For example, during the operation of video coding system 100 on enhancement layer 101, current video information may be provided to an internal bit depth increase module 102 in the form of a frame of video data and subjected to video transform and quantization processes by a transform and quantization module 108. The output of transform and quantization module 108 may be provided to an entropy coding module 109 and to a de-quantization and inverse transform module 110. De-quantization and inverse transform module 110 may implement the inverse of the operations undertaken by transform and quantization module 108. Those skilled in the art may recognize that transform and quantization modules and de-quantization and inverse transform modules as described herein may employ scaling techniques. The output of de-quantization and inverse transform module 110 may be provided to a loop including a de-blocking filter 114, a sample adaptive offset filter 116, an adaptive loop filter 118, a buffer 120, a motion estimation module 122, a motion compensation module 124, and an intra-frame prediction module 126. As shown in FIG. 1, the output of either motion compensation module 124 or intra-frame prediction module 126 is combined with the output of de-quantization and inverse transform module 110 as input to de-blocking filter 114.

For example, in video coding system 100, a current video frame may be provided to a motion estimation module 122. System 100 may process the current frame in units of image macroblocks (described below) in raster scan order. When video coding system 100 is operated in inter-prediction mode, motion estimation module 122 may generate a residual signal in response to the current video frame and a reference video frame. Motion compensation module 124 may then use the reference video frame and the residual signal provided by motion estimation module 122 to generate a predicted frame.

The predicted frame may then be subtracted from the current frame and the result provided to a macroblock (or MBlock or MB) allocator 106. Macroblock allocator 106 may partition the predicted frame for compression by division into one or more geometric macroblocks. The macroblock allocator may also assign the macroblocks to slices and/or define smaller division blocks that form the macroblocks. The result may be provided to the transform and quantization module 108 to generate a set of quantized transform coefficients which may be reordered and entropy coded by entropy coding module 109 to generate a portion of a compressed bitstream (for example, a Network Abstraction Layer (NAL) bitstream) provided by video coding system 100. In various implementations, a bitstream provided by video coding system 100 may include entropy-encoded coefficients in addition to side information used to decode each block (e.g., prediction modes, quantization parameters, motion vector information, and so forth) and may be provided to other systems and/or devices as described herein for transmission or storage.

The output of transform and quantization module 108 may also be provided to de-quantization and inverse transform module 110. De-quantization and inverse transform module 110 may implement the inverse of the operations undertaken by transform and quantization module 108 and the output of de-quantization, and inverse transform module 110 may be combined with the predicted frame to generate a reconstructed frame. When video coding system 100 is operated in intra-prediction mode, intra-frame prediction module 126 may use the reconstructed frame to undertake intra-prediction schemes that will not to be described in greater detail herein.

In one form, for the H.264/AVC standard and the like, the macroblocks are associated with a number of pixels, typically 16×16. The macroblocks may also be other sizes such as 8×8, or may themselves be further divided into 4×4 or 8×8 blocks for compression.

When an HEVC standard is being used, macroblocks have been replaced with coding units (CU) (also called large coding units (LCU)). For this standard, a current frame may be partitioned for compression by macroblock allocator 106 by division into one or more slices of coding tree blocks (e.g., 64×64 luma samples with corresponding chroma samples). Each coding tree block may also be divided into coding units (CU) in quad-tree split scheme. Further, each leaf CU on the quad-tree may be divided into partition units (PU) for motion-compensated prediction. In various implementations in accordance with the present disclosure, CUs may have various sizes including, but not limited to 64×64, 32×32, 16×16, and 8×8, while for a 2N×2N CU, the corresponding PUs may also have various sizes including, but not limited to, 2N×2N, 2N×N, N×2N, N×N, 2N×0.5N, 2N×1.5N, 0.5N×2N, and 1.5N×2N. It should be noted, however, that the foregoing are only example CU partition and PU partition shapes and sizes, the present disclosure not being limited to any particular CU partition and PU partition shapes and/or sizes.

Herein, the term "macroblock" is used generally to mean a block of pixels used for coding. Thus, a macroblock herein may refer to a CU, or to a PU of video data for HEVC and the like, or otherwise an 8×8 or 16×16 or other shaped block as a division of video or pixel data for H.264/AVC and the like, unless defined otherwise. It will be understood that the macroblock size may be uniform on each frame but may not be uniform from frame to frame, and may not always be uniform on a single frame.

In various implementations, and for both standards mentioned above, a slice may be designated as an I (Intra), P (Predicted), B (Bi-predicted), SP (Switching P), SI (Switching I) type slice, or the like. In general, a frame may include different slice types. Further, frames may be designated as either non-reference frames or as reference frames that may be used as references for inter-frame prediction. In I slices, spatial prediction is used, and in one form, only from data in the frame itself. In P slices, temporal (rather than spatial) prediction may be undertaken by estimating motion between frames. In B slices, two motion vectors, representing two motion estimates per PU may be used for temporal prediction or motion estimation. In other words, for example, a B slice may be predicted from slices on frames either the past, the future, or both relative to the B slice. In addition, motion may be estimated from multiple pictures occurring either in the past or in the future with regard to display order. In various implementations, motion may be estimated at the various CU or PU levels corresponding to the sizes mentioned above.

Similarly, during the operation of video coding system 100 on base layer 101', current video information may be provided to a spatial decimation or bit depth decrease module 103 in the form of a frame of video data and then passed to a macroblock allocator 106'. Macroblock allocator 106' performs partitioning of the frame for compression by division into macroblocks, and may partition the frame into one or more slices or blocks or both, and the result may be provided to a transform and quantization module 108'. Transform and quantization module 108' may perform video transform and quantization processes. The output of transform and quantization module 108' may be provided to a de-quantization and inverse transform module 110'. De-quantization and inverse transform module 110' may implement the inverse of the operations undertaken by transform and quantization module 108' to provide output to a loop including a de-blocking filter 114', a sample adaptive offset filter 116', an adaptive loop filter 118', a buffer 120', a motion estimation module 122', a motion compensation module 124', and an intra-frame prediction module 126'. Those skilled in the art may recognize that transform and quantization modules and de-quantization and inverse transform modules as described herein may employ scaling techniques. As shown in FIG. 1, the output of either motion compensation module 124' or intra-frame prediction module 126' are both combined with the output of de-quantization and inverse transform module 110' as input to de-blocking filter 114'.

In operation, during decoding a two-layer SVC bitstream may be de-muxed into two separate bitstreams (e.g. base layer 101' bitstream and enhancement layer 101 bitstream), for decoding. The base layer 101' bitstream could be independently decoded to reconstruct the base layer output video. For HEVC-based SVC, the base layer 101' bitstream could be decoded independently, while the enhancement layer 101 bitstream could not be independently decoded to reconstruct the output video. The enhancement layer 101 bitstream may be decoded together with the base layer reconstructed video, because inter-layer prediction may be used for the encoding of some enhancement layer blocks. The base layer 101' reconstructed video may be processed before being applied for inter-layer prediction. Additional operations for picture up-sampled for spatial scalability, picture tone mapping for bit-depth scalability, de-interlacing for interlace-progressive scalability, or some other kind of processing may optionally be performed.

As will be described in greater detail below, the present disclosure provides a number of possible implementations for the present system. With video coding system 100 (FIGS. 1-2), the bit-rate control may be performed by a video rate controller 150 that may integrate certain mapping tasks. The video rate controller 150 may be considered to be part of an encoder or may be separate or remote from the encoder. Alternatively, a video coding system 300 (FIG. 3) has a mapping control 302 that performs certain tasks externally or remotely from a video rate controller 310, and then transmits data to the video rate controller 310, for reduction of the bit-rate. The video rate controller 310 may or may not be part of an encoder 308. Many other combinations and examples are contemplated.

Figure 2:
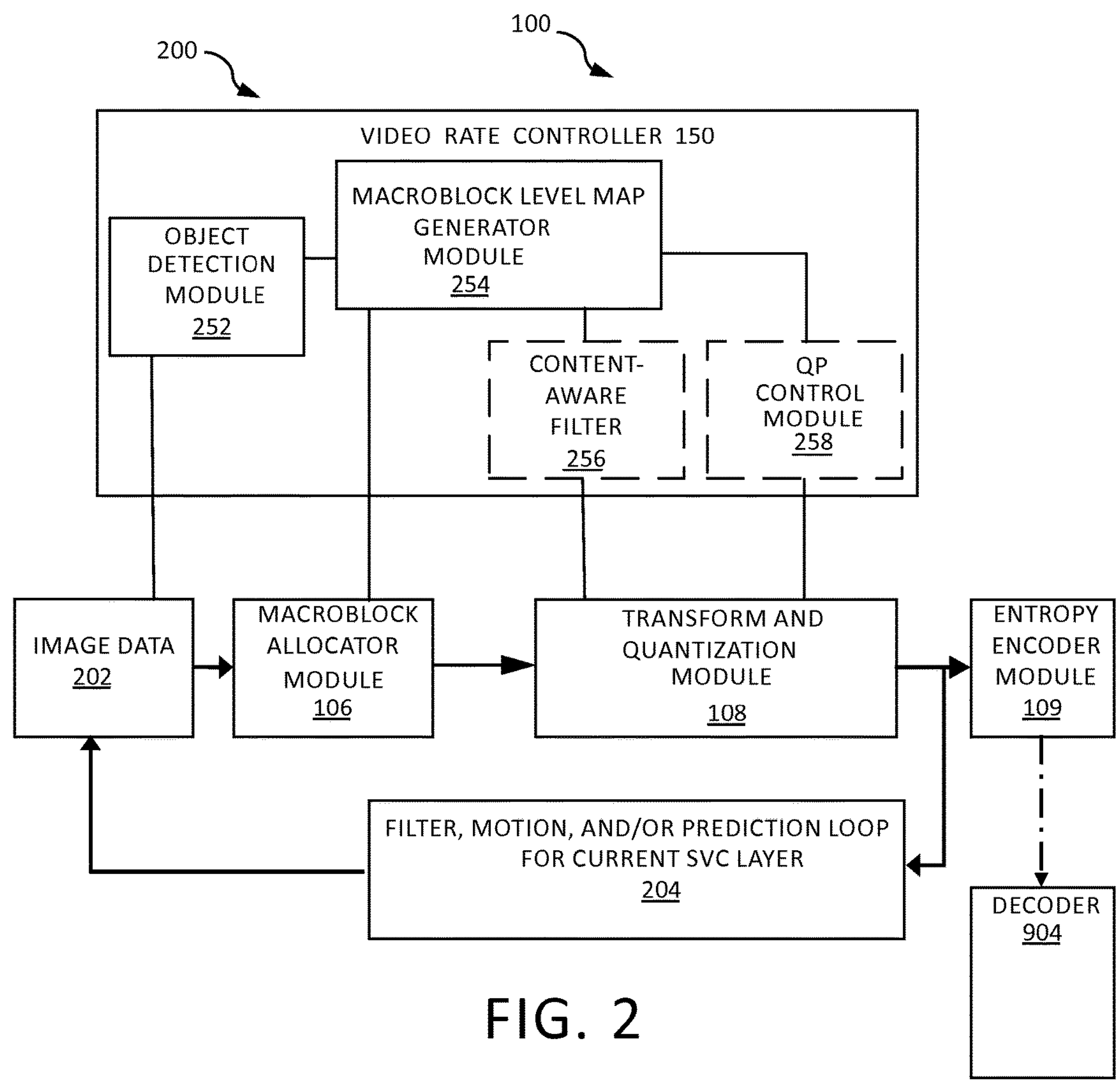
FIG. 2 is an illustrative diagram of a portion of the example video coding system of FIG. 1.

Referring to FIGS. 1-2, the video rate controller 150 may receive video frame data, and may be communicatively connected to the macroblock allocator 106 and 106', as well as the transform and quantization module 108 and 108'. While the video rate controller 150 is shown to change the bit-rate for both the base layer 101' and the enhancement layer 101, the video rate controller 150 may be operable on only one layer, on at least one layer, multiple specific layers, or all of the layers. The video rate controller 150 changes the bit-rate for the video data being encoded and in order to provide a lower bit-rate for a resulting encoded bitstream.

In general, the video rate controller 150 determines which of the macroblocks forming a frame or image also display at least a part of an object-of-interest, such as a face, in the image. The video rate controller 150 also determines which macroblocks display part of a non-object image such as part of a background. As used herein, the term "background" may refer to an area of a video image not defined as a region or object-of-interest, or simply referred to as the non-object, and that does not hold the close attention of a user. This may include image portions located behind or in front (e.g., foreground) of a determined object-of-interest. This is in contrast to the object or object-of-interest that may hold the attention of the user. The macroblocks that display the background, and in one form only background or non-objects, are mapped or labeled with a level that indicates a distance from the macroblock to a point defined relative to the object, such as the center point of the object. The image data used for the non-object macroblock then may be reduced depending on the level of the macroblock. In one form, this may be performed by the use of a QP scale factor or content-aware filter or both.

Additional and/or alternative details related to these approaches as well as to other aspects of video coding system 100 or 300, may be illustrated in one or more example implementations discussed in greater detail below with regard to FIGS. 2-6. As will be discussed in greater detail below, video coding systems 100 or 300 may be used to perform some or all of the various functions discussed below in connection with FIGS. 7 and 8.

Referring to FIG. 2, in one example form, both or either of the layers 101 and 101' of the video coding system 100 may have logic modules 200. Some of the logical modules may be included in the video rate controller 150. The video rate controller 150 may have an object detection module 252, macroblock level map generator module (or MB level generator or simply generator) 254, content-aware filter 256, and/or quantization parameter (QP) control module 258. The object detection module 252 and macroblock level map generator 254 may respectively connect, or communicatively or operatively couple, to image data 202 and macroblock allocator module 106 (or 106'). The content-aware filter 256 and QP control module 258 connect, or communicatively or operatively couple to, transform and quantization module 108 (or 108').

Figure 3:
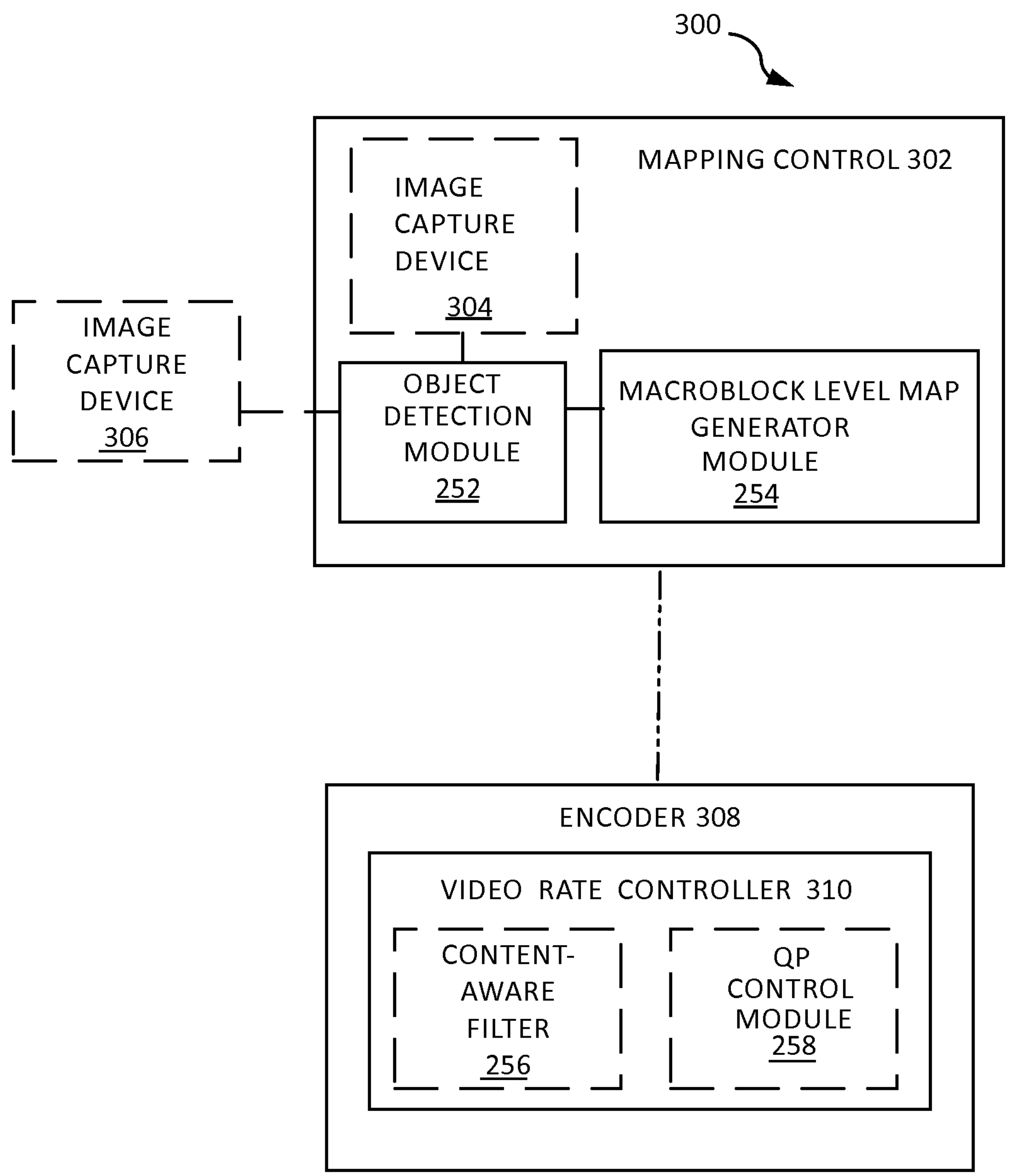
FIG. 3 is an illustrative diagram of an alternative video coding system.

Referring to FIG. 3, in one example alternative configuration, a separate mapping control 302 provides the object detection module 252 and macroblock level map generator module 254 rather than a video rate controller. In this example, an encoder 308 includes the video rate controller 310 with content-aware filter module 256 and/or QP control module 258. The mapping control 302 may also include an image capture device 304 or may be in communication with an image capture device 306. In one form, the mapping control 302 may be, or may be linked to a camera, such as a webcam or other digital or analog still or video camera. In some examples, video data may be captured via a webcam sensor or the like (e.g., a complementary metal-oxide-semiconductor-type image sensor (CMOS) or a charge-coupled device-type image sensor (CCD)), without the use of a red-green-blue (RGB) depth camera and/or microphone-array to locate who is speaking. In other examples, an RGB-Depth camera and/or microphone-array might be used in addition to or in the alternative to the webcam sensor. Many different types of cameras may be used with the present systems described herein.

For video coding system 300, the mapping control 302 may be separate from a video rate controller 310 within, or part of, the same encoder in the same device, such as a camera or device with photographic or video capture abilities. As another alternative, the mapping control 302 may be remote from the video controller 310 and encoder 308. In these cases, macroblock levels along with corresponding image data may be transmitted, or otherwise made accessible to, the video rate controller 310 which may or may not be stored elsewhere such as on a memory at a server or other network device. Otherwise, the level mapping and bit-rate reduction operates the same or similar to that performed with system 100 as described below.

Referring again to FIG. 2, in more detail, image data 202 receives frames of image data that include at least details for the luminance and color of each pixel. The image data may be received initially from an image capture device described herein, or may include looped data from the quantization module and via the filter, motion, and/or prediction loop 204 to add encoding of predicted frames, for example. Each frame (also referred to as an image or picture) may or may not include an image with an object or object-of-interest such as a face for video conferencing and a background. It will be understood, however, that the system 100 or 300 may operate where the image includes objects other than a face, such as animals, machines such as vehicles, and so forth where many different objects are the possible focus. For the H.264/AVC example, the image data may then be transmitted to the object detection module 252 and the macroblock allocator 106. The macroblock allocator 106 may divide the frames into macroblocks of 8×8, 16×16, or other sizes as well as other partitions for more efficient coding.

Figure 4:
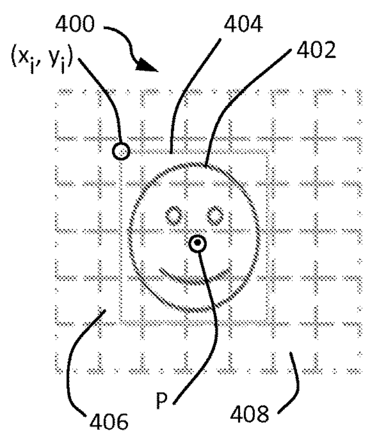
FIG. 4 is an illustrative diagram of a video frame according to one example video coding system.

Referring to FIG. 4, the object detection module 252 detects or tracks objects and determines whether one or more objects may be found in each frame I_in, and if so, detects the rigid or captured position of an object or objects in the frame. In some examples, the detection of a face as the object may include detection based at least in part on a Viola-Jones-type framework (see, e.g., Paul Viola, Michael Jones, Rapid Object Detection using a Boosted Cascade of Simple Features, CVPR 2001 and/or PCT/CN2010/000997, by Yangzhou Du, Qiang Li, entitled TECHNIQUES FOR FACE DETECTION AND TRACKING, filed Dec. 10, 2010). Such facial detection techniques may allow relative accumulations to include face detection, landmark detection, face alignment, smile/blink/gender/age detection, face recognition, detecting two or more faces, and/or the like. Many other examples for detecting faces and other objects exist and may be used by the present object detection module 252.

In the illustrated example, a frame or image 400 includes an object 402 marked within a rectangle 404. In order to determine and set the arrangement or position of the object within the image 400 in one example form, the object detection module 252 may assign the upper left corner of the rectangle as ($x_i$, $y_i$), and the size of the object may include the width of the object, as represented by the rectangle, as $w_i$, and the height of the object as $h_i$. For objects of irregular shapes, ($w_i$, $h_i$) may measure the maximum dimensions of the object although other dimensions (such as an average width and height for example) are contemplated. It will be understood that there are many other different ways to define the position of the object that may be used here. The position data for the detected object or objects $O_i$ as shown by equation (1) then may be provided to the macroblock level map generator 254:

$$O=\{o_1,o_2, \ldots o_M\}=\{(x_1,y_1,w_1,h_1),(x_2,y_2,w_2,h_2), \ldots (x_M,y_M,w_M,h_M)\} \quad (1)$$

where M in Equation (1) is the number of objects of interest within an image I_in.

The macroblock level map generator 254, or other module, may then calculate a location of a point P that is relative to the position of the object. This point may be a center point of the object, represented by a center point of the rectangle, or may be a centroid of the object or rectangle that considers the exact location of the area of the object for non-symmetrical or irregular shapes for example. Many other examples exist as to which point to use, such as an outer boundary point or a corner of the object or rectangle and so forth, and in one example, any point may be used as long as the point is used consistently for macroblocks throughout a frame. When multiple objects exist in a single frame, the single center point or centroid of the group of objects (referred to herein as an ensemble) may be determined for bit-rate control. In the illustrated example, the location of the center point of the object or objects $c_o=(x_o, y_o)$ may be determined by:

$$c_o = (x_o, y_o) = \left( \frac{\sum_{i=1}^{M} (x_i \times w_i \times h_i)}{\sum_{i=1}^{M} (w_i \times h_i)}, \frac{\sum_{i=1}^{M} (y_i \times w_i \times h_i)}{\sum_{i=1}^{M} (w_i \times h_i)} \right) \quad (2)$$

Still referring to FIG. 4, the macroblock level map generator module 254 may receive the macroblock assignments from macroblock allocator 106. Thus, frame 400 may be divided into macroblocks 402, and some object macroblocks 406 provide at least a part of object 404 on the image 400, and some non-object macroblocks 408 provide the background (or unimportant foreground) in the image 400. In one form, the non-object macroblocks 408 do not provide image data for any part of the object 404.

The macroblock level map generator 254 then may determine the position of the macroblocks in a frame relative to the position of the object in order to label each macroblock with the level of importance for coding and relative to the object. In one form, this operation may be provided for each macroblock in each frame. In other forms, the operation may be performed for at least one frame. It may be performed for initial video images, predicted frames, or both. In another form, the process may be performed for at least one macroblock in a frame or multiple macroblocks but less than all of the macroblocks in a frame.

Figure 5:
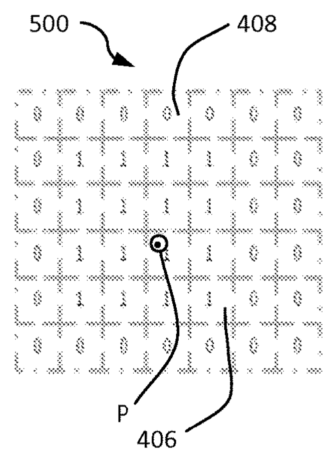
FIG. 5 is an illustrative diagram showing a mapping of the video frame of FIG. 4.

Referring to FIG. 5, in order to determine which macroblocks are non-object macroblocks, the resolution of image I_in is designated as ($W_{MB}$×K)×($H_{MB}$×L) with (K,L)∈IN, where IN is a set of integers, K, L is the total horizontal and vertical macroblock (MB) count for the image (or in other words the number of columns and rows of MBs in the image) starting with 0, 0 at the upper left corner of the image I_in, and $W_{MB}$×$H_{MB}$ is the resolution of one MB (typically measured in pixels but may be other defined units). A binary map 500 indicating whether an MB, $MB_{k,l}$, contains part of any object-of-interest can be derived as:

$$b_{k,l} = \begin{cases} 0, \text{ if } \forall\, i, \left\{ \begin{matrix} (k \times W_{MB}) > (x_i + w_i), \text{ or } ((k+1) \times W_{MB}) < x_i, \text{ or} \\ (l \times H_{MB}) > (y_i + h_i), \text{ or } ((l+1) \times H_{MB}) < y_i \end{matrix} \right\} \\ 1, \quad \text{otherwise} \end{cases} \quad (3)$$

where i (with i=1, . . . M) in the equations herein is the index of the instance of the object-of-interest. The resolution of the binary map in Equation (3) equals to the total number of MB within I_in (such that, k=0, 1, 2, . . . K−1, and l=0, 1, 2, . . . L−1). Applying the equation above to the illustrated example, $b_{k,l}$=1 for the object macroblocks 406, and $b_{k,l}$=0 for the non-object macroblocks 408.

Figure 6:
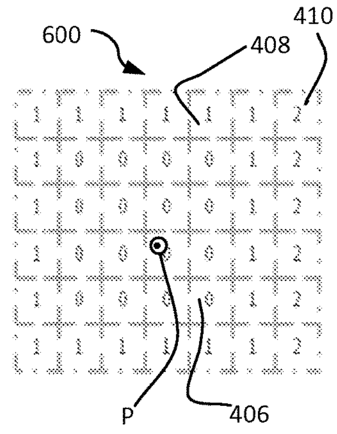
FIG. 6 is an illustrative diagram showing another mapping of the video frame of FIG. 4.

Referring to FIG. 6, once the binary bitmap 500 is established and the center point P location is obtained, the macroblock level map generator 254 may establish an MB level map $L_m$ with labels for each macroblock (or otherwise at least one macroblock or a plurality of macroblocks less than all of the macroblocks) indicating the level of importance of each $MB_{k,l}$. By one approach, the macroblock level map generator 254 will only reduce the number of image related bits, and therefore image quality, for the non-object macroblocks. The equation for obtaining the level map 600 may be:

$$\text{For } b_{k,l}=0, Lm_{k,l}=\lfloor (N-1)(1-e^{-d_{k,l}/g(N)}) \rfloor \quad (4\text{-}1)$$

where k=0, 1, 2, . . . K, l=0, 1, 2, . . . L, and where $$d_{k,l}=L2\_\text{norm}[((k+½)\times W_{MB},(l+½)\times H_{MB}),(x_O,y_O)] \quad (4\text{-}2)$$

$$\text{Otherwise for } b_{k,l}=1, Lm_{k,l}=0 \quad (4\text{-}3)$$

where g(N) in Equation (4-1) is a monotonically increasing function such that g(1) is less than g(2) which is less than g(3) and so forth, and N is the desired number of levels. g(N) may be specified by the application itself such as the video rate controller 150 or other part of the system, and in one specific example, g(N) may by derived or calculated by the macroblock level map generator module 254 itself, or may even have a default setting. By one example, g(N)=N. g(N) need not be so limited as long as g(N) is a monotonically increasing function. By the illustrated example, N is set here at three (including level 0 within the object). With a larger g(N) value, the transition from one macroblock level to another level, or specifically the range of distances assigned to a single level, will be smaller. From equations (1) to (4-2) then, it will be understood that the present method determines the position of at least one macroblock relative to the position of the object on the image, and then labels that macroblock with a level depending on the position. As explained below, the quality of the part of the image provided by the macroblock may then be adjusted depending, at least in part, on that positioning or level. More specifically, the equations above determine a distance from the macroblock to a point defined relative to the object, and this point may be the center point, centroid, outer boundary point, corner, or other relevant point of the object, or rectangle identifying the object, as long as it is used consistently over a frame of macroblocks. By another alternative, it may be possible to use more than one point on a frame in order to determine levels on different regions of the frame rather than having one set of levels for an entire frame. Thus, bit-rates may be reduced differently in this case depending on a region of the frame.

By yet another possible alternative, it will also be understood that the point herein may be an area rather than a single point with a single pixel location on the image, and in this case the distance to the macroblock, may be measured from the closest boundary point of the area to the macroblock for example.

The levels may each represent a specific distance or a range of distances from the point, and may be measured in pixels units obtained above from $W_{MB}$, $H_{MB}$ and $x_i$, $y_i$, $w_i$, and $h_i$ for example. In one example, each level may be associated with at least one different distance or range of distances from the point. The number of levels is not particularly limited except by the capacity of the system. With more levels, the transition or step in bit-rate between the levels will be smaller providing a relatively larger bit-rate but a smoother transition from object to background. Thus, where reduction of bit-rate may be the priority over a clear object boundary, fewer levels may be selected than the system capacity. In one form, at least two levels may be provided for labeling non-object macroblocks. At least one closer level (level 1 in FIG. 6, for example) may be disposed adjacent to macroblocks with an outer boundary of the object, while at least one other level (such as level 2 of FIG. 6) may be spaced from macroblocks that display the object. Such a level map 600 (FIG. 6) is an example of a three-level MB level map with a single object 402 represented in the image by object MBs 602 labeled as level 0, as well as MBs 408 and 410 respectively labeled 1 and 2 depending on their distance from the center point P in the illustrated example.

The number of levels may be set automatically or set as a default by video rate controller 150 or 310, the macroblock level map generator 254, or other module internal or external to the video rate controller 150 or 310. Otherwise, the number of levels may be set by another application or program, or may even be based on an available transmission bit-rate. Thus, in some forms, it may be possible to determine the available bit-rate as received from one or more decoders, and/or the system may or may not factor in standard bit-rate restrictions based on particular applications or computer programs. The bit-rate may then be adjusted to match the available bit-rate. For one example, where a number of receiver clients exist for a video conference, each of the receivers contact a server (MCU/multipoint control unit) and provide their preferred video formats (resolution or codecs and so forth) as well as the bandwidth between receiver and server. The server will aggregate all of these requests and generate a minimal bandwidth and resolution set which fits most clients while achieving the best quality possible. This bandwidth and resolution set will be passed to an encoder, and the encoder will determine how to generate layers and allocate bandwidth among the receivers. The available bit-rate is calculated in Bps (bits per second). The video rate control 150 may then adjust the encoded bit-rate, by adjusting the number of levels for example, based on this available bit-rate.

It will be understood that in one alternative, object macroblocks may also be processed by the video rate controller 150 or 310 so that within the object 404 itself, the macroblocks at or nearest to the relevant point P, such as the center point of the object, receive the highest quality image coding, while macroblocks positioned away from the center point although still considered within the object receive slightly lower quality image coding in order to provide at least some further reduction in bit-rate. In this case, further level divisions may be defined within the object where the 0 level may be reserved for those macroblocks at or nearest to the center point, or other relevant point, of the object.

Also as mentioned above, when an image holds multiple objects, the center point, centroid, or other point relative to the object is calculated as the single point for the group of objects. This causes macroblocks closer to the center point to be coded with a better quality image than those macroblocks farther from the center point. This may be provided to avoid a large calculation load even though it might lower the image quality of objects located farther from the center of the group of objects.

Once the macroblock levels are mapped (FIG. 6), the levels may be provided to the content-aware filter module 256, the QP control module 258, or both. When the content-aware filter 256 is used, the content-aware filter will obtain the level for the macroblock currently being analyzed, and a filter strength may be set depending on the macroblock level with the filter strength increasing with the increase of the level number, for one example (although the filtering may be set to decrease with an increase of level number when such is appropriate and consistent with the other equations). The filtering then may be applied to the image data provided for that macroblock to reduce the amount of data, such as by eliminating the high frequency data, and this process continues for each of the macroblocks. In one form, the image data for each of the non-object macroblocks are reduced rather than for the object macroblocks but this need not always be so as explained above.

In more detail, the content-aware filter may be a Gaussian low pass filter by one example, although it will be understood that other types of filters may be used. The content-aware filter applies filtering to frame I_in with its filter strength spatially adaptive to the MB level map of I_in. The output of the content-aware filter, I_int, may be calculated as:

$$I\_int(x,y)=f(Lm_{\lfloor x/W_{MB}\rfloor,\lfloor y/H_{MB}\rfloor},x,y)*I\_in(x,y), \quad (5)$$

where x=0, 1, 2, . . . ($W_{MB}$×K−1), and y=0, 1, 2, . . . ($H_{MB}$×L−1), and Lm in equation (5) becomes a filter strength s. To achieve bit-rate reduction, f(s,x,y) in the above equation may be a Low-Pass-Filter (LPF) with its filter strength s monotonically increasing with the value of the MB label. Thus, for non-object macroblocks, the filtering strength may be stronger for level 2 macroblocks 410 compared to level 1 macroblocks 408 closer to object 402. Such filtering may reduce the amount of image data associated with macroblocks in relatively smaller increments as the macroblock distance from the relevant point increases. This provides a much smoother transition from the object to the background in the image for example, and along the boundary of the object, compared to other one-step systems that simply code the object and background differently. Such a smooth transition avoids a blocky effect that may be caused by adaptive filtering.

If no content-aware QP control is provided, the filtered image data then may be provided to the transform and quantization 108 (or 108') for normal transform and quantization as described below. Alternatively, the filtered image data may be passed to the QP control module 258, or the QP control module 258 may be provided instead of the content-aware filter module 256.

The QP control module 258 receives the MB level map data, and selects a scaling factor sf depending on a level of a macroblock. The scaling factor may be provided by the QP control module itself 258, other module within the video rate controller 150 or 302, or may be provided by other encoding applications such as Handbrake. The scaling factor may be applied on a macroblock-by-macroblock basis depending on the macroblock level to calculate a quantization parameter for each macroblock. In one experiment described below, a sf of 1.4 was used. Assuming a fixed QP, $QP^I$, the proposed QP control module 258 determines $QP_{k,l}$ of $MB_{k,l}$ as:

$$QP_{k,l}=sf^{LM_{k,l}}\times QP^I \text{ where } sf\geq 1. \quad (6)$$

Once the QP for each macroblock is obtained, transform and quantization of the image data may proceed as normal for these frames. Also, frames without any detected object may also proceed under normal transform and quantization. For normal quantization, residuals are transformed into the spatial frequency domain by an integer transform that approximates a discrete cosine transform (DCT). The QP determines the step size for associating the transformed coefficients with a finite set of steps. Large values of QP represent big steps that crudely approximate the spatial transform, so that most of the signal can be captured by only a few coefficients. Small values of QP more accurately approximate the block's spatial frequency spectrum, but at the cost of more bits. In order to accomplish this, algorithms may be used that factor in both prediction error and the available bit-rate. In H.264, each unit increase of QP lengthens the step size by 12% and reduces the bitrate by roughly 12%.

More specifically, in one form, DCT calculations may be performed, although other types of coefficient calculations may be used by the video coding system 100. In one form, this may include 4×4 or 8×8 matrix multiplication using the provided pixel data. The matrix operators (elements of each matrix) may be an eight bit integer, and the results may be limited to a 16 bit integer. The result of such DCT calculations may then be 4×4 or 8×8 matrices of coefficients in the frequency domain.

The coefficient blocks or matrices are then quantized and used in calculations to simplify the coefficients (for example, turning all coefficients into real numbers within a certain range or quantization step (QS) the size of which may be selected depending on the QP). By one example, a sequence of zero coefficients, which may typically form a significant part of any image, can then be discarded (or more accurately simply counted) to compress the data for the encoded bitstream. In one example form, where A/QP=B, and where A is a coefficient, while QP is a quantization parameter and B is an integer with a relatively small range. B then may be encoded into a bit stream. A decoder that receives B may then perform calculations such as A'=QP*B where A' does not necessarily equal A, but it may be relatively close. The value of QP determines the accuracy.

Once the transform and quantization module 108 is finished with the coefficients, entropy encoder module 109 performs entropy coding, and the encoded bitstream may be transmitted to a decoder 904 (see FIG. 9) that has bit-rate restrictions mentioned above.

As discussed in greater detail below, video coding system 100 or 300 may be used to perform some or all of the various functions discussed below in connection with FIGS. 7 and/or 8.

Figure 7:
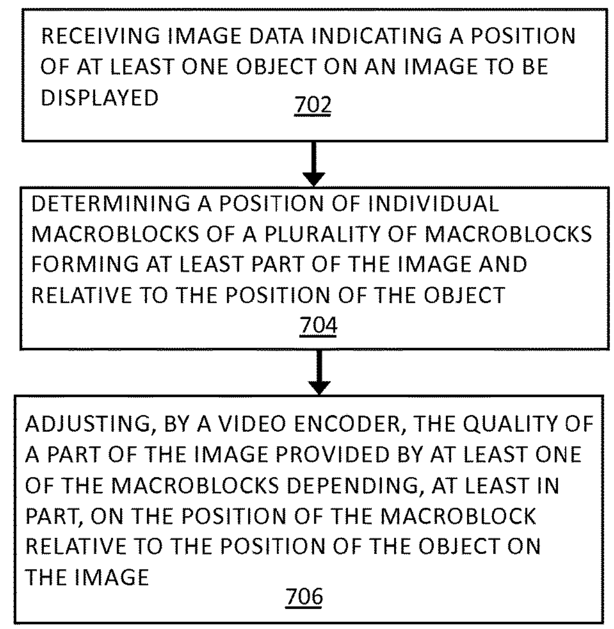
FIG. 7 is a flow chart illustrating an example video coding process.

Referring to FIG. 7, an example video coding process 700 is arranged in accordance with at least some implementations of the present disclosure. In the illustrated implementation, process 700 may include one or more operations, functions or actions as illustrated by one or more of boxes 702, 704, and/or 706. By way of non-limiting example, process 700 will be described herein with reference to example video coding system 100 or 300 of FIGS. 1-6.

Process 700 may be used as a computer-implemented method for slice level bit-rate control for video coding using object-of-interest data. Process 700 may begin with operation 702 "RECEIVING IMAGE DATA INDICATING A POSITION OF AT LEAST ONE OBJECT ON AN IMAGE TO BE DISPLAYED", where a macroblock level map generator module may receive image data indicating a position of an object on an image to be displayed. In some alternatives, the macroblock level map generator may be located at a video rate controller or separate mapping control, and may be located at a video encoder or remote from the video encoder.

Processing may continue from operation 702 to operation 704, "DETERMINING A POSITION OF INDIVIDUAL MACROBLOCKS OF A PLURALITY OF MACROBLOCKS FORMING AT LEAST PART OF THE IMAGE AND RELATIVE TO THE POSITION OF THE OBJECT", where the macroblock level map generator module may determine a position of individual macroblocks of a plurality of macroblocks forming at least part of the image and relative to the position of the object. By some examples, the macroblock position may be determined relative to a center point or other point of the object. By one example, a distance from the macroblock to the center point may be used to label the macroblock with a level depending on the distance from the center point and indicating the importance of the macroblock.

Processing may then continue from operation 704 to operation 706 "ADJUSTING, BY A VIDEO ENCODER, THE QUALITY OF A PART OF THE IMAGE PROVIDED BY AT LEAST ONE OF THE MACROBLOCKS DEPENDING, AT LEAST IN PART, ON THE POSITION OF THE MACROBLOCK RELATIVE TO THE POSITION OF THE OBJECT ON THE IMAGE", where a video encoder adjusts the quality of a part of the image provided by at least one of the macroblocks depending, at least in part, on the position of the macroblock relative to the position of the object on the image. By one example, the video encoder may have a video rate controller with a content-aware filter module, QP control module, or other program or module that reduces the number of bits used to provide a part of the image associated with a macroblock, thereby reducing the quality of the image part provided by that macroblock.

Some additional and/or alternative details related to process 700 may be illustrated in one or more examples of implementations discussed in greater detail below with regard to FIG. 8. Specifically, for example, a video rate controller may have a content-aware filter module, a QP control module, or both, and the order of the operation may be different depending on which modules are used.

Referring to FIG. 8, example video coding system 100 operates video coding process 700 in accordance with at least some implementations of the present disclosure. A process using both the content-aware filter module 256 and QP control module 258 is shown in solid line and some optional, alternative approaches are indicated in dashed line. In more detail and in the illustrated implementation, process 800 may include one or more operations, functions, or actions as illustrated by one or more of actions 802 to 834 numbered evenly. By way of non-limiting example, process 800 will be described herein with reference to example video coding system 100 of FIGS. 1-2 and 7.

In the illustrated implementation, video coding system 100 may include logic modules 200, the like, and/or combinations thereof. For example, logic modules 200 may include those logic modules forming the video rate controller 150 such as object detection module 252, macroblock level map generator module 254, content-aware filter 256, and/or quantization parameter (QP) control module 258, the like, and/or combinations thereof. These logic modules also coordinate or are communicatively coupled to the video frame feed or image data 202 and macroblock allocator 106 described above, as well as the transform and quantization module 108 shown in FIG. 8, and which may or may not be considered part of logic modules 200. The macroblock level map generator 254 may be configured to map importance levels to macroblocks depending on the position of the macroblock relative to an object on the image. The different video rate controller 150 may then adjust the image quality of the part of the image provided by a macroblock depending on the position or level of the macroblock. This adjustment may be performed by the content-aware filter module 256, or the QP control module 258, or both. The content-aware filter module 256 uses a low pass filter to remove data, such as high frequency data in one example, to reduce the number of bits used to display a part of the image provided by the macroblock. The strength of the filter may be set depending on the level of the macroblock. Similarly, the QP control module 258 uses a scaling factor to adjust at least one quantization parameter, and in turn the size of the quantization steps and amount of data lost in this lossy compression, again depending on the level of the macroblock. Although video coding system 100, as shown in FIG. 8, may include one particular set of operations or actions associated with particular modules, these operations or actions may be associated with different modules than the particular modules illustrated here.

Process 800 may be used as a computer-implemented method for bit-rate control for video coding using object-of-interest data. Process 800 may first include operations "RECEIVE IMAGE DATA" 802, and the image data may then be used by the object detection module 252 to "DETECT OBJECT LOCATIONS" 804 and to map the object position including the location and size of one or more objects in an image. This object location information (see equation (1) above for one example) then may be made available for operation 806 by the macroblock level map generator module 254. The macroblock level map generator module 254 (also referred to herein as MB level generator) may "RECEIVE MACROBLOCK ALLOCATIONS" 808 from a macroblock allocator 106 for example and that include the position of the macroblocks on an image. The MB level generator 254 may then use the object location information and the macroblock positions to "DETERMINE WHICH MBs DISPLAY AT LEAST PART OF AN OBJECT" 810. By one example approach, this may be accomplished by using equation (3) above.

Once it is determined which macroblocks have image data that show at least part of the object, these object macroblocks are labeled as level 0 (equation 4-3). A calculation may then be used to "ASSIGN LEVELS TO MBs" 812, and in the present example, to non-object MBs to indicate the distance from the non-object MB to the object (see equation (4-1) and (4-2) above for example). In one example, the distance may be measured from the center point P of the object. In one form, the MB level generator 254 assigns the levels higher as the macroblock is positioned farther away from the object or the point P. As noted above, alternatively, the levels may be numbered to ascend in the opposite direction, and level assignments may be provided to object MBs as well in an alternative operation. Once the levels have been assigned to the macroblocks, the levels and other image data may be made available for operation 814 by modules of the video rate controller 150 that adjust the image data to be compressed and transmitted to a receiver and decoder.

Specifically, and for the illustrated example where both the MB image data will be both filtered and have its QP adjusted, the operation 814 may proceed with first filtering the image data. The content-aware filter module uses the levels and macroblock image data to "FILTER IMAGE DATA AT LEAST IN PART DEPENDING ON LEVEL OF MB" 818. As mentioned above, this includes adjusting the strength of the filter depending on the level (equation (5) for example). The stronger the filter, the more image data will be discarded. The remaining image data and the macroblock levels are then made accessible for operation 820 by the QP control module 258 when present.

While FIG. 8 shows that certain modules receive data from a different module or other component, it will be understood that this includes one component storing data and making the data available for another component to obtain the data from storage, whether a controller, module, encoder, and so forth.

Next, the QP control module 258 uses the level of the macroblock to select a scaling factor (#) for each macroblock. The transform and quantization module 108 may "ESTABLISH QP" 824 for normal operation, and provide the QP for operation 826 by the QP control module 258. The QP control module 258 may then use the QP and scaling factor sf to "ADJUST QP BASED AT LEAST IN PART ON LEVEL OF MB" 828 by using a calculation for each macroblock (see equation (6) for example). The adjusted quantization parameter then may be provided to adjust a compression of at least one macroblock. Specifically, once the quantization parameter adjustment is complete, operation 830 may continue with the transform and quantization module 108 as mentioned previously to "COMPLETE QUANTIZATION" 832 and to "SEND DATA TO ENTROPY ENCODER" 834. With this operation, the QP are adjusted at least in part based on at least two prior, content-aware, bit-rate adjustments: the filtering of the image data depending on the macroblock level, and then adjustment of the QP by a scaling factor that also depends on the macroblock level.

In other alternative forms, the video rate controller 150, application, or other program, or even a user, may have the option to choose filtering or QP adjustment or both. In other alternatives, the system 100 may only provide either the filter or the QP adjustment. When only the filtering is provided, after the filtering operation 818, operation 822 may then continue directly with the transform and quantization module 108 to complete quantization and compression 832. Otherwise, when the QP is adjusted without filtering, after the levels are assigned 812, the operation 816 may continue directly to the QP control module 258 for adjustment of the QP based on the levels of the macroblocks 828. In this case, the operation 830 may then continue with the transform and quantization module 108 to continue with the compression.

For the configuration of a single object in the image, such as a human face for video chatting by one example, and used with the two level non-object MB labels such as that shown in FIG. 6, it has been found that bit-rate reduction using both the content-aware filtering and QP adjustment results in a significant drop in bit-rate compared to a system with no bit-rate reduction and compared to a system using only one of the bit-rate reduction methods. Thus, in one experiment, using the same image with a detected face, the system achieved 96 fps and an average bitstream of 268 kbps bit-rate without bit-rate reduction applied. When filtering alone was used, the system achieved 128 fps and an average bit-rate of 178 kbps or a 90 kbps or 33.6% reduction in bit-rate. For the illustrated example, a 12×12 and a 20×20 2D weighting low pass filter with filter strength of 1/144 and 1/400 for macro block with level map equals to one and two, respectively. When QP adjustment was applied alone with a scaling factor of 1.4, the system achieved 122 fps and an average 134 kbps bit-rate for a reduction of 134 kbps or 50%. Finally, when both methods were applied with the scaling factor of 1.4, the system achieved 106 fps and an average bitstream of 116 kbps for a reduction of 152 kbps or 56.7%.

In addition, any one or more of the operations of FIGS. 7 and 8 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 7 and 8 in response to instructions conveyed to the processor by a computer readable medium. As mentioned above, in one form, a non-transitory computer readable medium may be provided.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
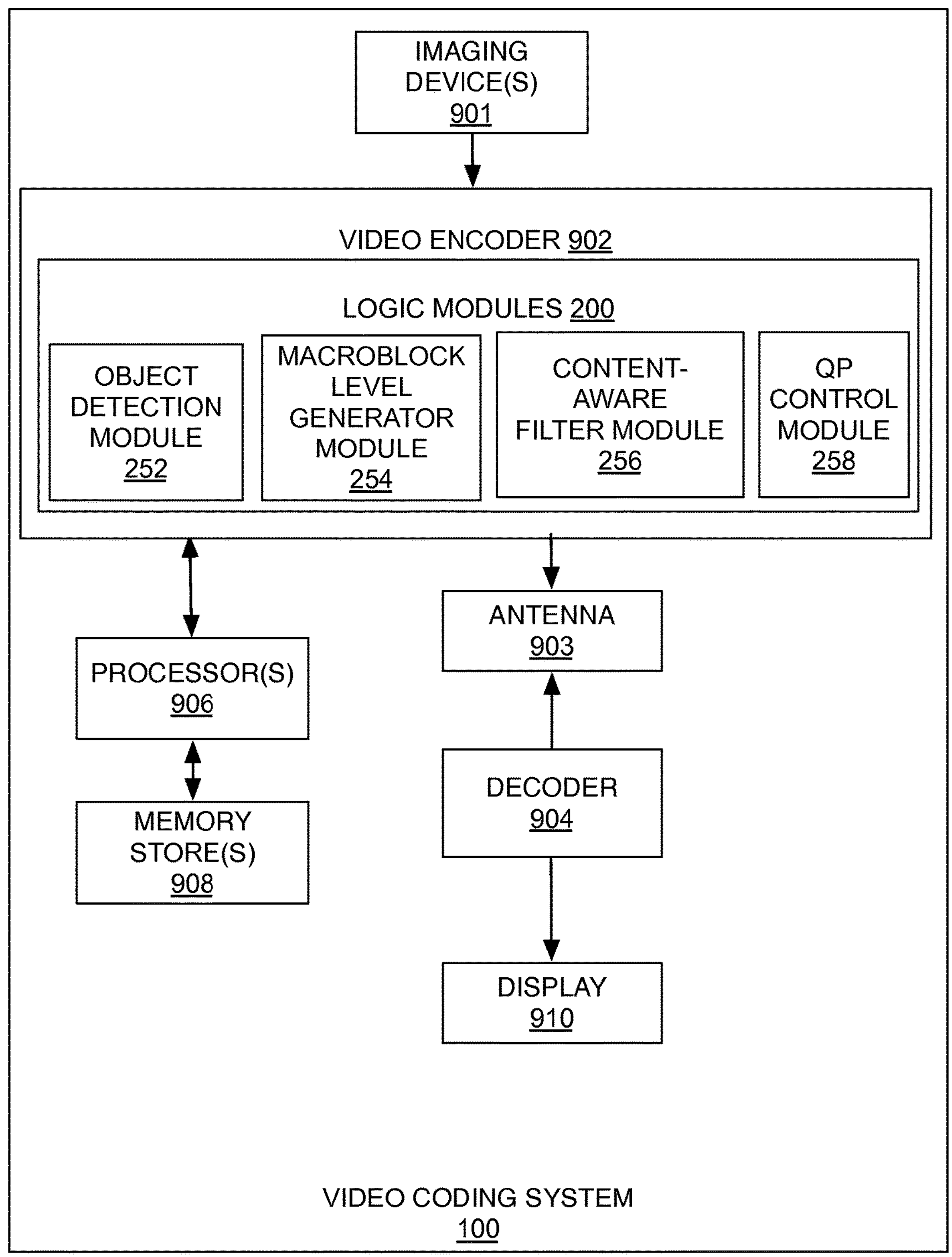
FIG. 9 is an illustrative diagram of an example video coding system.

Referring to FIG. 9, an example video coding system 100 may be arranged in accordance with at least some implementations of the present disclosure. In the illustrated implementation, video coding system 100 may include imaging device(s) 901, a video encoder 902, an antenna 903, a video decoder 904, one or more processors 906, one or more memory stores 908, a display 910, and/or logic modules 200. Logic modules 200 may include a video rate controller 150 with an object detection module 252 and a macroblock level map generator module 254. Optionally, video rate controller 150 may also include content-aware filter module 256 and/or QP control module 258, the like, and/or combinations thereof.

As illustrated, imaging device(s) 901, encoder 902, processor 906, and/or memory store 908, may be capable of communication with one another and/or communication with portions of logic modules 200. Similarly, antenna 903, video decoder 904, and/or display 910 may be capable of communication with one another and/or communication with portions of logic modules 200. Accordingly, video encoder 902 may include all or portions of logic modules 200, while video decoder 904 may include similar logic modules. Also, as mentioned above with the description of FIG. 3, the system may have a remote mapping control 302 that divides the logic modules 200 between the video encoder 902 and the mapping control 302. Although video coding system 100, as shown in FIG. 9, or system 300, may include one particular set of operations, components, or actions associated with particular modules, these operations, components, or actions may be associated with different modules than the particular modules illustrated here.

In some examples, video encoder 902 may be configured to control the bit-rate of an encoded bitstream by reducing the number of bits provided by a macroblock depending on the position of the macroblock relative to the position of at least one object on the image. Video coding system 100 also may include antenna 903, video decoder 904, the like, and/or combinations thereof. Antenna 903 may be configured to communicate an encoded bitstream of video data, and specifically, for example, receive an encoded bitstream from the encoder 902 and transmit the encoded bitstream to a decoder 904. Video decoder 904 may be communicatively coupled to antenna 903 and may be configured to decode the encoded bitstream.

In other examples, video coding system 100 may include display device 910, one or more processors 906, one or more memory stores 908, object detection module 252, a macroblock level map generator module 254, content-aware filter module 256, and/or QP control module 258, the like, and/or combinations thereof. Display 910 may be configured to present video data. Processors 906 may be communicatively coupled to display 910. Memory stores 908 may be communicatively coupled to the one or more processors 906. The macroblock level map generator 254 of video encoder 902 (or video decoder 904 in other examples) may be communicatively coupled to the one or more processors 906 and may be configured to label macroblocks with levels corresponding to at least one distance from a macroblock to a center point or other relevant point of an object on the image, for example.

By various approaches, the logic modules including the object detection module 252, macroblock level map generator module 254, content-aware filter module 256, and/or QP control module of video rate controller 150 or mapping control 302/controller 308 may be implemented in hardware, while software may implement other logic modules. For example, in some forms, object detection module 252 and macroblock level map generator module 254 may be implemented by application-specific integrated circuit (ASIC) logic while content-aware filter module 256 and/or QP control module 258 may be provided by software instructions executed by logic such as processors 906. However, the present disclosure is not limited in this regard and any of the video rate controller 150 or 308 modules may be implemented by any combination of hardware, firmware and/or software. In addition, memory stores 908 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 908 may be implemented by cache memory.

Figure 10:
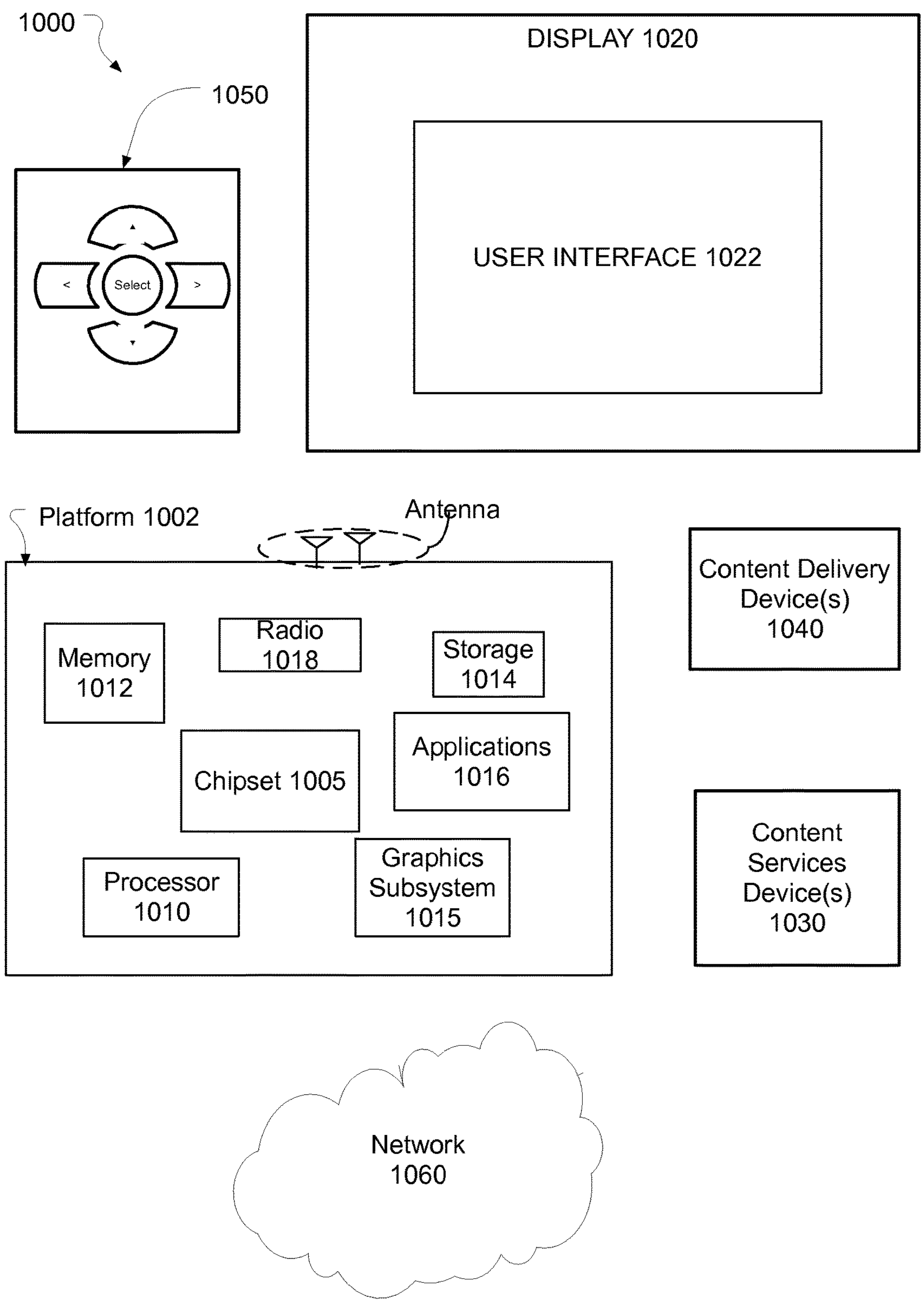
FIG. 10 is an illustrative diagram of an example system for operating the example video coding system.

Referring to FIG. 10, an example system 1000 in accordance with the present disclosure operates one or more aspects of the video coding system described herein. It will be understood from the nature of the system components described below that such components may be associated with, or used to operate, certain part or parts of the video coding system described above. In various implementations, system 1000 may be a media system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, Display Port, wireless HDMI, and/or wireless HD compliant techniques. Graphics subsystem 1015 may be integrated into processor 1010 or chipset 1005. In some implementations, graphics subsystem 1015 may be a stand-alone card communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of unidirectionally or bidirectionally communicating content between content providers and platform 1002 and/display 1020, via network 1060 or directly. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In embodiments, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off" In addition, chipset 1005 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 10.

Figure 11:
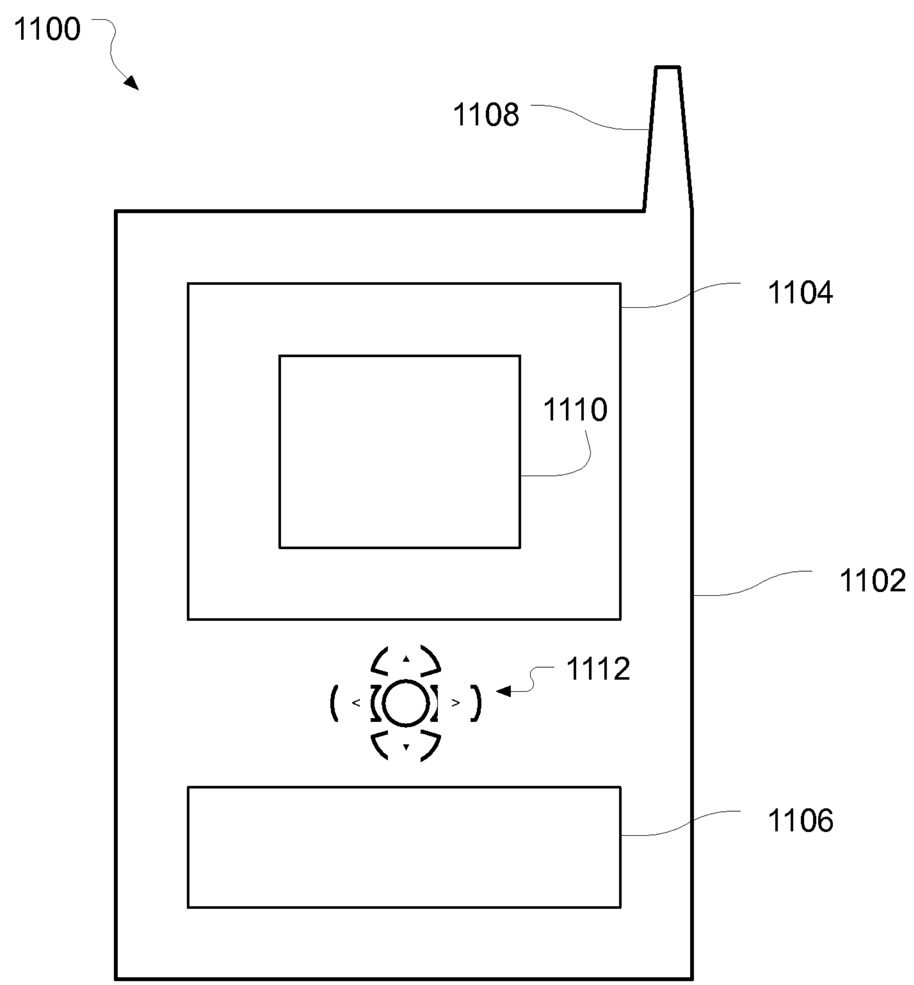
FIG. 11 is an illustrative diagram of an example system, all arranged in accordance with at least some implementations of the present disclosure.

Referring to FIG. 11, a small form factor device 1100 is one example of the varying physical styles or form factors in which system 1000 may be embodied. By this approach, device 1100 may be implemented as a mobile computing device having wireless capabilities. A mobile computing device may refer to any device having a processing system and a mobile power source or supply, such as one or more batteries or a solar panel, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing 1102, a display 1104, an input/output (I/O) device 1106, and an antenna 1108. Device 1100 also may include navigation features 1112. Display 1104 may include any suitable display unit for displaying information appropriate for a mobile computing device. I/O device 1106 may include any suitable I/O device for entering information into a mobile computing device. Examples for I/O device 1106 may include an alphanumeric keyboard, a numeric keypad, a touch pad, input keys, buttons, switches, rocker switches, microphones, speakers, voice recognition device and software, and so forth. Information also may be entered into device 1100 by way of microphone (not shown). Such information may be digitized by a voice recognition device (not shown). The embodiments are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment or implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

A computer-implemented method for video coding comprises receiving image data indicating a position of at least one object on an image to be displayed, and determining a position of individual macroblocks of a plurality of macroblocks forming at least part of the image and relative to the position of the object. The method then includes adjusting, by a video encoder, the quality of a part of the image provided by at least one of the macroblocks depending, at least in part, on the position of the macroblock relative to the position of the object on the image.

The method may also comprise determining which of the macroblocks are non-object macroblocks that do not form a part of the object, and the adjusting comprises adjusting the image quality for the non-object macroblocks. The adjusting may also comprise adjusting the quality of the part of the image for a macroblock depending, at least in part, on a distance from the macroblock to a point defined relative to the object. In one example, this may include adjusting the quality of the part of the image depending, at least in part, on a distance from a macroblock to at least one of: a center point and a centroid of the object. By one approach, the method comprises associating each of a plurality of the macroblocks with at least one of a plurality of levels, where each level may be associated with at least one different distance from a point defined relative to the object. In a particular example, there may be at least two levels provided for labeling non-object macroblocks. In other examples, at least one level may be disposed adjacent to macroblocks having an outer boundary of the object, and at least one other level may be spaced from macroblocks that display the object. In some examples, the adjusting comprises adjusting a filter strength to reduce the number of bits associated with a macroblock. In other examples, adjusting comprises setting a scaling factor used to calculate a quantization parameter (QP) assigned to a macroblock. By yet other examples, adjusting the quality depends, at least in part, on a distance from at least one macroblock to a center point of a group of objects on the image. Also, in one form, the object may be a human face.

By another implementation, a system for video coding on a computer comprises a display, at least one processor communicatively coupled to the display, and at least one memory communicatively coupled to the processor. A macroblock level map generator may be communicatively coupled to the processor, and may be configured to receive image data indicating a position of at least one object on an image to be displayed, and determine a position of individual macroblocks of a plurality of macroblocks forming at least part of the image and relative to the position of the object. A video rate controller may be communicatively coupled to the processor, and may be configured to adjust the quality of a part of the image provided by at least one of the macroblocks depending, at least in part, on the position of the macroblock relative to the position of the object on the image.

In some forms, the macroblock level map generator determines which of the macroblocks are non-object macroblocks that do not form a part of the object. The video rate controller may be configured to adjust the image quality for the non-object macroblocks, and may be configured to adjust the quality of the part of the image for a macroblock depending, at least in part, on a distance from the macroblock to a point defined relative to the object. Otherwise, the video rate controller may be configured to adjust the quality of the part of the image depending, at least in part, on a distance from a macroblock to at least one of: a center point and a centroid of the object. The macroblock level map generator also may be configured to associate individual macroblocks of a plurality of the macroblocks with at least one of a plurality of levels, each level being associated with at least one different distance from a point defined relative to the object. In other examples, the macroblock level map generator is configured to associate individual macroblocks of a plurality of the macroblocks with at least one of a plurality of levels, each level being associated with at least one different distance from a point defined relative to the object. By one approach, at least two levels are provided for labeling non-object macroblocks. By another approach, at least one level may be disposed adjacent to macroblocks having an outer boundary of the object, and at least one other level may be spaced from macroblocks that display the object. By yet another approach, the video rate controller may be configured to adjust the image quality, at least in part, by adjusting a filter strength to reduce the number of bits associated with a macroblock. For some implementations, the video rate controller may be configured to adjust the image quality, at least in part, by setting a scaling factor used to calculate a quantization parameter (QP) assigned to a macroblock. In other implementations, the video rate controller may be configured to adjust the quality of the image depending, at least in part, on a distance from at least one macroblock to a center point of a group of objects on the image.

For other implementations, a non-transitory article for video coding having stored therein a computer program having instructions that when executed, cause the computer to access image data indicating a position of at least one object on an image to be displayed, determine a position of individual macroblocks of a plurality of macroblocks forming at least part of the image and relative to the position of the object, and adjust the quality of a part of the image provided by at least one of the macroblocks depending, at least in part, on the position of the macroblock relative to the position of the object on the image.

In yet another alternative, the instructions cause the computer to determine which of the macroblocks are non-object macroblocks that do not form a part of the object, and adjust comprises adjust the image quality for the non-object macroblocks, and where adjust the quality comprises adjusting the quality of the part of the image for a macroblock depending, at least in part, on a distance from the macroblock to a point defined relative to the object. Adjust the quality also may comprise adjusting the quality of the part of the image depending, at least in part, on a distance from the macroblock to a point defined relative to the object. In one form, this includes adjusting the quality of the part of the image depending, at least in part, on a distance from a macroblock to at least one of: a center point and a centroid of the object. In other examples, the instructions cause the computer to associate individual macroblocks of a plurality of the macroblocks with at least one of a plurality of levels, each level may be associated with at least one different distance from a point defined relative to the object. In one form, at least two levels are provided for labeling non-object macroblocks. In one form, at least one level may be disposed adjacent to macroblocks having an outer boundary of the object, and at least one other level may be spaced from macroblocks that display the object. Also, in one form, the instructions result in adjusting a filter strength to reduce the number of bits associated with a macroblock. In another or additional form, the instructions result in setting a scaling factor used to calculate a quantization parameter (QP) assigned to a macroblock. Adjusting the quality may also depend, at least in part, on a distance from at least one macroblock to a center point of a group of objects on the image. By one approach, the object may be a human face.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed:

1. A computer-implemented method for video coding, comprising:

receiving image data indicating a position of at least one content object in a scene provided on an image to be displayed;

pre-setting importance levels available to form a macroblock level map of an image and that indicate a desired image quality of each level, the levels comprising at least one object level to indicate a location of a macroblock of image data within one of the objects and at least two non-object importance levels comprising one non-object importance level to be adjacent macroblocks forming one of the objects and the other non-object importance level to be spaced from the macroblocks forming one of the objects, wherein multiple macroblocks can be assigned to the same pre-set non-object level, and wherein each non-object level covers a different range of distances from the object;

generating the macroblock level map comprising:

determining a position of individual macroblocks of a plurality of macroblocks forming at least part of the image and relative to the position of the object, and assigning one of the pre-set levels to multiple macroblocks depending on whether the position of the macroblock corresponds to the range of distances of a level; and adjusting, by a video encoder, the quality of a part of the image provided by at least one of the macroblocks depending, at least in part, on the position of the macroblock relative to the position of the object on the image and comprising:

adjusting a filter strength of a filter by using the macroblock level map and by an adjustment depending on the level of the macroblock, wherein a same adjustment value of the filter strength is applied to all image data within the same macroblock and varies from macroblocks in one level to macroblocks in another level, filtering the number of bits associated with a macroblock and by using the adjusted filter strength to reduce the number of bits associated with the macroblock after an encoder partitions the image into macroblocks but before providing the macroblock to transform and quantize data of the macroblock, and setting a scaling factor to be used to calculate a quantization parameter (QP) assigned to a macroblock by using the macroblock level map used to adjust the filter strength.

2. The method of claim 1 comprising determining which of the macroblocks are non-object macroblocks that do not form a part of the object, and wherein adjusting comprises adjusting the image quality for the non-object macroblocks.

3. The method of claim 1 wherein adjusting comprises adjusting the quality of the part of the image for a macroblock depending, at least in part, on a distance from the macroblock to a point defined relative to the object.

4. The method of claim 1 wherein adjusting comprises adjusting the quality of the part of the image depending, at least in part, on a distance from a macroblock to at least one of: a center point and a centroid of the object.

5. The method of claim 1 wherein each level being associated with at least one different distance from a point defined relative to the object.

6. The method of claim 1 comprising associating each of a plurality of the macroblocks with at least one of a plurality of the levels, each level being associated with at least one different distance from a point defined relative to the object, and wherein at least two levels are provided for labeling non-object macroblocks.

7. The method of claim 1 comprising associating each of a plurality of the macroblocks with at least one of a plurality of the levels, each level being associated with at least one different distance from a point defined relative to the object, and wherein at least one level is disposed adjacent to macroblocks having an outer boundary of the object, and at least one other level is spaced from macroblocks that display the object.

8. The method of claim 1 wherein adjusting a filter strength to reduce the number of bits associated with a macroblock comprises obtaining the level of a macroblock; and adjusting the filter strength to be stronger as the macroblock is farther from the object as indicated by the level.

9. The method of claim 1, comprising determining which of the macroblocks are non-object macroblocks that do not form a part of the object, and wherein adjusting comprises adjusting the image quality for the non-object macroblocks,
- wherein adjusting comprises adjusting the quality of the part of the image for a macroblock depending, at least in part, on a distance from the macroblock to a point defined relative to the object,
- wherein adjusting comprises adjusting the quality of the part of the image depending, at least in part, on a distance from a macroblock to at least one of: a center point and a centroid of the object,
- wherein each level being associated with at least one different distance from a point defined relative to the object,
- wherein at least one level is disposed adjacent to macroblocks having an outer boundary of the object, and at least one other level is spaced from macroblocks that display the object,
- wherein adjusting a filter strength to reduce the number of bits associated with a macroblock comprises obtaining the level of a macroblock; and adjusting the filter strength to be stronger as the macroblock is farther from the object as indicated by the level;
- wherein adjusting the quality depends, at least in part, on a distance from at least one macroblock to a center point of a group of objects on the image, and
- wherein the object is a human face.

10. A system for video coding on a computer:
- a display;
- at least one processor communicatively coupled to the display;
- at least one memory communicatively coupled to the processor;
- a macroblock level map generator communicatively coupled to the processor and configured to:
  - receive image data indicating a position of at least one content object in a scene provided on an image to be displayed,
  - pre-set importance levels available to form a macroblock level map of an image and that indicate a desired image quality of each level, the levels comprising at least one object level to indicate a location of a macroblock of image data within one of the objects and at least two non-object importance levels comprising one non-object importance level to be adjacent macroblocks forming one of the objects and the other non-object importance level to be spaced from the macroblocks forming one of the objects, wherein multiple macroblocks can be assigned to the same pre-set non-object level, and wherein each non-object level covers a different range of distances from the object, and
  - generate a macroblock level map comprising:
    - determining a position of individual macroblocks of a plurality of macroblocks forming at least part of the image, and
    - assigning one of the pre-set levels to multiple macroblocks depending on whether the position of the macroblock corresponds to the range of distances of a level; and
- a video rate controller communicatively coupled to the processor and configured to adjust the quality of a part of the image provided by at least one of the macroblocks depending, at least in part, on the position of the macroblock relative to the position of the object on the image and comprises:
  - adjusting a filter strength of a filter by using the macroblock level map and by an adjustment depending on the level of the macroblock, wherein a same adjustment value of the filter strength is applied to all image data within the same macroblock and varies from macroblocks in one level to macroblocks in another level,
  - filtering the number of bits associated with a macroblock and by using the adjusted filter strength to reduce the number of bits associated with the macroblock after an encoder partitions the image into macroblocks but before providing the macroblock to transform and quantize data of the macroblock, and
  - setting a scaling factor to be used to calculate a quantization parameter (QP) assigned to a macroblock by using the macroblock level map used to adjust the filter strength.

11. The system of claim 10 wherein the macroblock level map generator is configured to determine which of the macroblocks are non-object macroblocks that do not form a part of the object, and wherein the video rate controller is configured to adjust the image quality for the non-object macroblocks.

12. The system of claim 10 wherein the video rate controller is configured to adjust the quality of the part of the image for a macroblock depending, at least in part, on a distance from the macroblock to a point defined relative to the object.

13. The system of claim 10 wherein the video rate controller is configured to adjust the quality of the part of the image depending, at least in part, on a distance from a macroblock to at least one of: a center point and a centroid of the object.

14. The system of claim 10 wherein each level being associated with at least one different distance from a point defined relative to the object.

15. The system of claim 10 wherein each level being associated with at least one different distance from a point defined relative to the object, and wherein at least two levels are provided for labeling non-object macroblocks.

16. The system of claim 10 wherein each level being associated with at least one different distance from a point defined relative to the object, and wherein at least one level is disposed adjacent to macroblocks having an outer boundary of the object, and at least one other level is spaced from macroblocks that display the object.

17. The system of claim 10 wherein the video rate controller operates by adjusting the filter strength to be stronger as the macroblock is farther from the object as indicated by the level.

18. The system of claim 10 wherein the video rate controller is configured to adjust the quality of the image depending, at least in part, on a distance from at least one macroblock to a center point of a group of objects on the image.

19. The system of claim 10 wherein the macroblock level map generator determines which of the macroblocks are non-object macroblocks that do not form a part of the object, wherein the video rate controller is configured to adjust the image quality for the non-object macroblocks, wherein the video rate controller is configured to adjust the quality of the part of the image for a macroblock depending, at least in part, on a distance from the macroblock to a point defined relative to the object, wherein the video rate controller is configured to adjust the quality of the part of the image depending, at least in part, on a distance from a macroblock to at least one of: a center point and a centroid of the object, wherein each of the levels being associated with at least one different distance from a point defined relative to the object, wherein at least one of the levels is disposed adjacent to macroblocks having an outer boundary of the object, and at least one other level is spaced from macroblocks that display the object, wherein the bit rate controller operates by adjusting the filter strength to be stronger as the macroblock is farther from the object as indicated by the level, and wherein the video rate controller is configured to adjust the quality of the image depending, at least in part, on a distance from at least one macroblock to a center point of a group of objects on the image.

20. At least one non-transitory article for video coding having stored therein a computer program having instructions that when executed, cause the computer to:

access image data indicating a position of at least one content object in a scene provided on an image to be displayed;

pre-set importance levels available to form a macroblock level map of an image and that indicate a desired image quality of each level the levels comprising at least one object level to indicate a location of a macroblock of image data within one of the objects and at least two non-object importance levels comprising one non-object importance level to be adjacent macroblocks forming one of the objects and the other non-object importance level to be spaced from the macroblocks forming one of the objects, wherein multiple macroblocks can be assigned to the same pre-set non-object level and wherein each non-object level covers a different range of distances from the object;

generate a macroblock level map comprising determining a position of individual macroblocks of a plurality of macroblocks forming at least part of the image comprising assigning a level to individual macroblocks that indicate a position of the macroblock relative to the position of the object, wherein each level includes a range of distances from the object, and wherein each macroblock has image data of a plurality of pixels; and adjust, by a video encoder, the quality of a part of the image provided by at least one of the macroblocks depending, at least in part, on the position of the macroblock relative to the position of the object on the image and comprising:

adjust a filter strength of a filter by using the macroblock level map and by an adjustment depending on the level of the macroblock, wherein a same adjustment value of the filter strength is applied to all image data within the same macroblock and varies from macroblocks in one level to macroblocks in another level, provide the option to perform either:

(1) filter the number of bits associated with a macroblock and by using the adjusted filter strength to reduce the number of bits associated with the macroblock after an encoder partitioned the image into macroblocks but before providing the macroblock to transform and quantize data of the macroblock, or (2) set a scaling factor to be used to calculate a quantization parameter (QP) assigned to a macroblock by using the macroblock level map used to adjust the filter strength, or (3) both (1) and (2);

wherein the computing device provides the option to alternatively perform options (1), (2), and (3).

21. The article of claim 20 comprising instructions that when executed, cause the computer to:

determine which of the macroblocks are non-object macroblocks that do not form a part of the object, and wherein adjust comprises adjust the image quality for the non-object macroblocks, wherein adjust the quality comprises adjusting the quality of the part of the image for a macroblock depending, at least in part, on a distance from the macroblock to a point defined relative to the object, wherein adjust the quality comprises adjusting the quality of the part of the image depending, at least in part, on a distance from a macroblock to at least one of: a center point and a centroid of the object, associate individual macroblocks of a plurality of the macroblocks with at least one of a plurality of the levels, each level being associated with at least one different distance from a point defined relative to the object, wherein at least one level is disposed adjacent to macroblocks having an outer boundary of the object, and at least one other level is spaced from macroblocks that display the object, wherein adjusting a filter strength to reduce the number of bits associated with a macroblock comprises adjusting the filter strength to be stronger as the macroblock is farther from the object as indicated by the level, wherein the filter is a low pass filter that eliminates high frequency data of a macroblock depending on the strength of the filter as modified depending on the position of the macroblock, wherein adjust the quality depends, at least in part, on a distance from at least one macroblock to a center point of a group of objects on the image, and wherein the object is a human face.

22. The method of claim 1 wherein the filter is a low pass filter that eliminates high frequency data of a macroblock depending on the strength of the filter as modified depending on the position of the macroblock.

23. The system of claim 10 wherein the filter is a low pass filter that eliminates high frequency data of a macroblock depending on the strength of the filter as modified depending on the position of the macroblock.

* * * * *